June 30, 1970  W. P. KERN  3,517,638
INDICATING DIAL ASSEMBLY
Filed Nov. 25, 1966
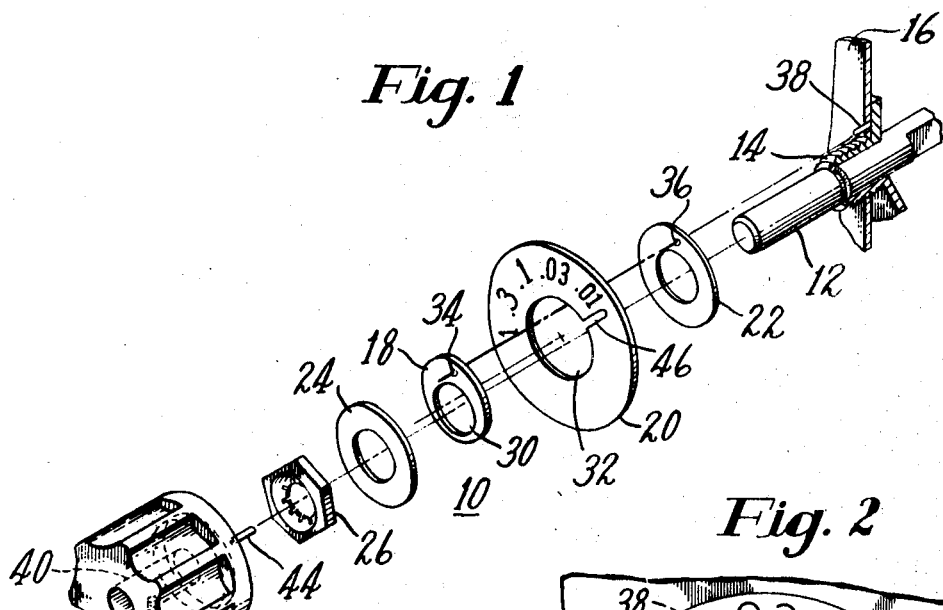
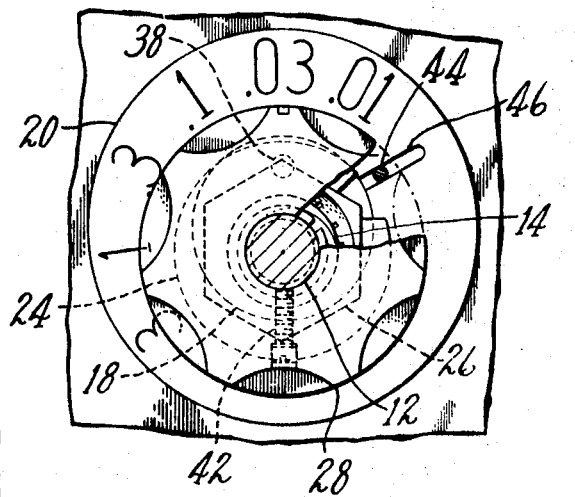
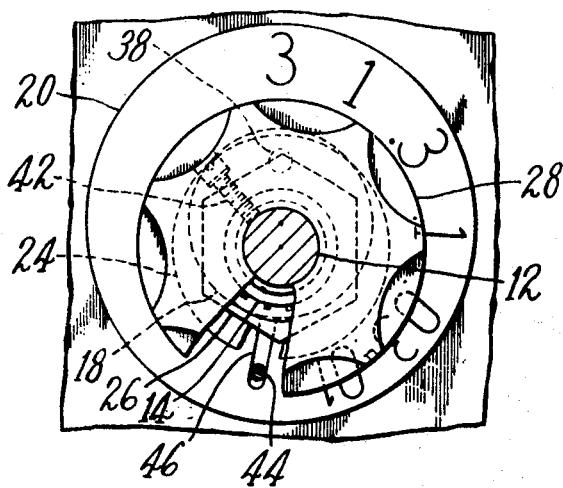
*Inventor*
Walter P. Kern
By his Attorney
Robert E. Ross

# United States Patent Office 3,517,638
Patented June 30, 1970

3,517,638
INDICATING DIAL ASSEMBLY
Walter P. Kern, 672 Jerusalem Road,
Cohasset, Mass. 02025
Filed Nov. 25, 1966, Ser. No. 596,900
Int. Cl. G05g 1/10
U.S. Cl. 116—115                    4 Claims

ABSTRACT OF THE DISCLOSURE

An indicator dial assembly for mounting onto a rotatable control shaft extending from a support panel. The dial is rotatably mounted on an eccentric bushing, or washer, which is mounted on the control shaft. This arrangement permits the dial to be rotated about an axis offset from the axis of rotation of the control shaft so that indicia on the periphery of the dial are fully exposed from behind the periphery of an operating knob disposed on the shaft only when positioned in a predetermined orientation in relation to the control shaft.

---

This invention relates generally to a control knob and indicating dial assembly for use with electrical and electronic apparatus or other devices in which rotatable shafts are utilized to position or determine the position of portions of the apparatus.

Such devices are commonly used in electronic apparatus to control the setting of switches, variable resistors or capacitors, for example, and in a simple form comprise a knob having means for being non-rotatably secured to a shaft, with an indicator dial secured thereto, having indicia disposed thereon for indicating the position of the portion of the apparatus secured to the knob.

Due to space limitations on the control panels of many types of apparatus, the diameter of the indicator dial must often be reduced to a size such that the indicia on the dial are difficult to read. In cases where the number of indicia required on the dial is greater at one location than for another, the size of the indicia must be reduced so that their peripheral extent does not exceed the space available.

The object of this invention is to provide a knob and indicating dial assembly in which the indicating dial rotates on an axis offset from the axis of the knob and the shaft on which it is mounted so that the portion of the dial which is to be observed for determining the position of the controlled device extends laterally from said knob to a greater distance than the portion of the dial opposite that which is to be observed.

A further object of the invention is to provide a knob and indicating dial assembly which has means for providing greater angular rotation of the dial in relation to the angular rotation of the knob at certain portions of the rotation than at other portions thereof.

Other objects of the invention will be apparent to one skilled in the art from the following detailed description of a specific embodiment thereof.

In the drawing:

FIG. 1 is an exploded perspective view of a knob and indicator dial assembly embodying the features of the invention.

FIG. 2 is a front plan view of the assembly of FIG. 1 with the dial in a first position.

FIG. 3 is a view similar to FIG. 2 with the dial in a second position.

Referring to the drawing there is illustrated a knob and indicator assembly 10 for assembly onto a control shaft 12 and a threaded shaft housing 14 extending from a support panel 16.

In the illustrated embodiment, the assembly 10 comprises an eccentric bushing 18, an indicator dial 20, a pair of spacing washers 22 and 24, and a retaining nut 26 for assembly over the shaft housing 14, and a knob 28 for assembly onto the shaft 12.

The shaft housing 14 is non-rotatably mounted on the panel and retained in assembly therewith by the retaining nut 26. The control shaft 12 is rotatably disposed in the housing 14, and is rotated by manual manipulation of the knob 28 to adjust an electrical or mechanical position of a piece of apparatus (not shown) connected to the shaft behind the panel.

The bushing 18 has a circular periphery and an aperture 30 having a center which is offset from the center of the periphery. The dial 20 has a center aperture 32 which is sized to permit the dial to be assembled onto the bushing 18. The bushing 18 is slightly thicker than the dial 20 so that when the bushing and dial are assembled onto the threaded shaft housing 14 and clamped between the washers 22 and 24 against the panel 16 by the nut 26, the dial 20 is free to rotate on the bushing. Since the center of the periphery of the bushing is offset from the center of the control shaft 12 the center of rotation of the indicator dial 20 will also be offset from the center of rotation of the shaft. To prevent rotation of the bushing 18 and thereby insure that the direction in which said center of rotation of the dial is offset from the shaft does not change, the bushing 18 and the washer 22 are provided with small index holes 34 and 36 to receive a locating pin 38 projecting from the panel.

The knob 28 is provided with an aperture 40 to enable it to be assembled onto the end of the shaft 12 and insure means, such as a set screw 42 to enable it to be non-rotatably secured to the shaft.

To provide means for causing rotation of the indicating dial as the knob and shaft are rotated, the knob is provided with a pin 44 which projects into an aperture 46 in the dial. It will be apparent that since the pin 44 rotates on a circle which is concentric with the shaft, and the dial 20 rotates about an axis which is offset from the axis of the shaft, the pin 44 must move radially in relation to the dial as the shaft rotates. For this reason, the aperture 46 is elongated radially which provides an additional advantage to be described hereinafter.

The center of the periphery of the bushing 18, in the illustrated embodiment, is offset upwardly from the shaft axis, hence as the knob is rotated the uppermost portion of the dial extends above the knob a greater distance than the lowermost portion thereof, so that indicia on the peripheral portions of the dial are fully exposed above the top of the knob, even though they are partially or completely obscured at the side and bottom portion of the dial.

One advantage of the herein described assembly is the fact that with a required size of indicia, less control panel area is required than if the dial rotated concentrically with the shaft, or conversely, when a predetermined area is available on a control panel, larger and more readable indicia may be provided by the use of the knob and dial assembly disclosed herein.

Another advantage of the disclosed structure results from the fact that the amount of angular rotation of the dial per unit of angular rotation of the shaft varies slightly thoughout the shaft rotation.

For example, the dial rotates one degree for each degree of shaft rotation only when the pin 44 and slot 46 are disposed generally horizontally from the shaft, that is, with the pin and slot in a line which is generally perpendicular to a line from the shaft axis to the axis of the periphery of the bushing 18.

When the pin is at an angular position below the knob, as in FIG. 3, rotation of the knob of one degree causes slightly less than one degree rotation of the dial. Whereas, however, when the pin and slot are above the dial, or on the same side of the shaft axis as the center of the periphery of the bushing, rotation of the knob and shaft by one degree causes more than one degree of rotation of the dial.

This effect is useful in laying out indicia on dials in situations where some positions of the dial require single numbers or letters, and other positions require two or more numbers or letters. In such cases the aperture 46 may be located circumferentially in the same portion of the dial as the indicia that occupies the greatest distance circumferentially.

Since certain obvious changes may be made in the illustrative device without departing from the scope of the invention, it is intended that all matters contained herein be interpreted in an illustrative and not a limiting sense.

I claim:

1. An indicator dial assembly for mounting onto a control shaft housing between a support from which the shaft extends and a control knob for rotating a shaft extending through the housing, comprising a bushing having a center aperture to receive the housing and having a circular periphery having a center offset from that of the center aperture, a circular indicator dial rotatably mounted on the bushing periphery whereby said dial is rotatable about an axis offset from the axis of the shaft, said bushing having means to prevent rotation thereof in relation to the support when the shaft rotates, and said dial having means for engagement with the control knob so that said dial is rotated when the shaft rotates.

2. A control knob and indicator dial for assembly onto a control shaft rotatably extending from a support, said knob having means for being non-rotatably secured to the shaft, means for rotatably mounting said indicator dial on the shaft so that it is rotated by the knob about an axis offset from the center of the shaft as the knob rotates, whereby the indicator dial always extends laterally from the knob in one direction in relation to the support a greater distance than in the opposite direction, regardless of the orientation of the dial relative to said support.

3. A control knob and indicator dial for assembly onto a control shaft rotatably extending from a support, said knob having means for being non-rotatably secured to the shaft, a circular bushing having an off-center opening for receiving the shaft, locating means for restraining said bushing from rotating when the shaft is rotated, said indicator dial having indicia on a peripheral portion uniformly spaced from the axis of rotation and being concentrically and rotatably mounted on the periphery of said circular bushing, and means connecting said knob and said dial for causing rotation of said dial on said bushing as the knob rotates, whereby the dial always extends laterally from the knob in one direction in relation to the support a greater distance than in the opposite direction regardless of the orientation of the dial relative to said support so the indicia are completely exposed when disposed in said one direction from the knob.

4. A control knob and indicator dial assembly, comprising a shaft rotatable to various angular positions, an eccentric bushing on said shaft, locating means restraining said bushing from rotating when the shaft is rotated, an indicator dial concentrically rotatably mounted on said bushing and a knob concentrically non-rotatably mounted on said shaft, whereby said dial extends beyond one position of the periphery of said knob a greater distance on one side than on the opposite portion, and means connecting said knob and said dial for causing said dial to rotate with the shaft.

References Cited
UNITED STATES PATENTS

| 2,431,036 | 11/1947 | Grisdale et al. | 116—124.2 |
| 2,532,970 | 12/1950 | Van Dyke | 116—133 |
| 2,558,326 | 6/1951 | Van Dyke | 338—149 X |
| 2,709,924 | 6/1955 | Castelli | 116—115.5 X |
| 2,805,636 | 9/1957 | Smith | 116—115 |

LOUIS R. PRINCE, Primary Examiner

D. M. YASICH, Assistant Examiner

U.S. Cl. X.R.

116—124